(12) United States Patent
Takada et al.

(10) Patent No.: US 7,972,700 B2
(45) Date of Patent: Jul. 5, 2011

(54) LAMINATED FILM

(75) Inventors: Yasushi Takada, Otsu (JP); Masato Yanagibashi, Otsu (JP)

(73) Assignee: Toray Industries, Inc. (JP)

( * ) Notice: Subject to any disclaimer, the term of this patent is extended or adjusted under 35 U.S.C. 154(b) by 649 days.

(21) Appl. No.: 11/991,836

(22) PCT Filed: Sep. 11, 2006

(86) PCT No.: PCT/JP2006/317951
§ 371 (c)(1),
(2), (4) Date: Mar. 11, 2008

(87) PCT Pub. No.: WO2007/032295
PCT Pub. Date: Mar. 22, 2007

(65) Prior Publication Data
US 2010/0239868 A1    Sep. 23, 2010

(30) Foreign Application Priority Data
Sep. 12, 2005  (JP) ................................. 2005-263422

(51) Int. Cl.
*B32B 27/40* (2006.01)
(52) U.S. Cl. .................. 428/423.1; 428/423.7
(58) Field of Classification Search ............... 428/423.7, 428/423.1
See application file for complete search history.

(56) References Cited

U.S. PATENT DOCUMENTS

| | | | | |
|---|---|---|---|---|
| 6,124,398 A | * | 9/2000 | Imashiro et al. | 525/61 |
| 6,194,061 B1 | * | 2/2001 | Satoh et al. | 428/341 |
| 7,192,680 B2 | * | 3/2007 | Yau et al. | 430/138 |

FOREIGN PATENT DOCUMENTS

| | | |
|---|---|---|
| JP | 47-33279 | 8/1972 |
| JP | 53-26828 | 3/1978 |
| JP | 53-26829 | 3/1978 |
| JP | 53-98336 | 8/1978 |
| JP | 54-46294 A | 4/1979 |
| JP | 56-116718 A | 9/1981 |
| JP | 60-209073 A | 10/1985 |
| JP | 61-124684 A | 6/1986 |
| JP | 62-240318 A | 10/1987 |
| JP | 4-345634 A | 12/1992 |
| JP | 6-346019 A | 12/1994 |
| JP | 9-11423 A | 1/1997 |
| JP | 9-235508 A | 9/1997 |
| JP | 2000-229394 A | 8/2000 |
| JP | 2001-79994 A | 3/2001 |
| JP | 2001-138465 A | 5/2001 |
| JP | 2001-200075 A | 7/2001 |
| JP | 2002-53687 A | 2/2002 |
| JP | 2003-49135 A | 2/2003 |

* cited by examiner

Primary Examiner — Thao T. Tran
(74) Attorney, Agent, or Firm — DLA Piper LLP (US)

(57) ABSTRACT

A laminated film including a thermoplastic resin film, and a laminated layer disposed on at least one surface of the thermoplastic resin film including an acryl-urethane copolymer resin (A), and a polyester resin (B), and a crosslinking agent (C) including an isocyanate crosslinking agent, a carbodiimide crosslinking agent or mixtures thereof, the amount of the crosslinking agent (C) is from 5 to 70 parts by weight based on 100 parts by weight of the sum of the acryl-urethane copolymer resin (A) and the polyester resin (B).

9 Claims, No Drawings

LAMINATED FILM

RELATED APPLICATIONS

This is a §371 of International Application No. PCT/JP2006/317951, with an inter-national filing date of Sep. 11, 2006 (WO 2007/032295 A1, published Mar. 22, 2007), which is based on Japanese Patent Application No. 2005-263422, filed Sep. 12, 2005.

TECHNICAL FIELD

This disclosure relates to a laminated film wherein a laminating layer composed of a specific resin and a specific crosslinking agent is formed, more specifically, an optical film with improved adhesiveness for display articles, such as a liquid crystal television, a plasma display television and a rear projection television, or a film excellent in adhesion to various adherends.

BACKGROUND

Thermoplastic resin films, in particular, biaxially oriented polyester films are excellent in mechanical property, electric property, dimension stability, heat resistance, transparency, chemical resistance and other properties; thus, the films are widely used as a base film for many materials such as magnetic recording materials, wrapping materials, electrically insulating materials, various photographic materials, photosensitive materials, thermosensitive materials, and graphic art materials. In particular, the use frequency thereof has been rising as various optical films, a typical example thereof being a displaying member concerned with display, in connection with the advance of IT technique in recent years.

In particular, polyester films are used as the base film of hard coat films, antireflective films, plasma lens films, lenticular lens films, optical diffusion films, light concentrating films, and so on that are used in liquid crystal televisions (LCDs), plasma display televisions (PDPs), rear projection televisions (RP-TVs) and others from the viewpoint of excellent mechanical property, dimension stability and transparency thereof, and others. In many cases, a film having a thickness of 50 μm or more is used. When a polyester film is used in the above-mentioned articles or the like, the film is required to have, for example, adhesion to a hard coat layer, adhesion to a prism lens, adhesion to a lenticular lens, or adhesion to an optical diffusion layer. In these layers, ultraviolet (UV) curable resin is generally used in many cases. The film is required to have adhesion to the layers.

In the meantime, in the surface of biaxially oriented polyester films, generally, the crystal thereof is highly oriented; thus, the films have a drawback of being poor in adhesion to various paints, adhesives, inks and others products. A case where the films are used for the above-mentioned optical articles is not exceptional, either. The films are not adhered at all to, for example, a UV curable resin which constitutes a hard coat layer or a prism lens layer. Accordingly, in a working step after the formation of the functional layer, or in actual use of the optical articles, a problem that the functional layer is peeled off from the base film, and other problems are caused. For this reason, methods have been hitherto investigated for giving an easily-adhering property to the surface of a polyester film in various manners. Suggested are, for example, methods of forming an acrylic-modified polyurethane, into a primer layer, on the surface of a film (Japanese Unexamined Patent Publications (Kokai) 1: JP-A-346019 (claims on page 1) and (Kokai): JP-A-2000-229394 (claims on page 1)), a method of forming a copolymerized polyester into a primer layer (Japanese Unexamined Patent Publication (Kokai): JP-A-2001-138465 (claims on page 1)), methods of forming a copolymerized polyester resin and an isocyanate crosslinking agent into a primer layer (Japanese Unexamined Patent Publications (Kokai): JP-A-9-11423 (claims on page 1), JP-A-2002-53687 (claims on page 1) and JP-A-2003-49135 (claims on page 1)), and a method of using a carbodiimide crosslinking agent as a crosslinking agent in a primer layer (Japanese Unexamined Patent Publication (Kokai): JP-A-2001-79994 (claims on page 1)). In the art, carried out are actively, in particular, methods of forming the primer layer by coating, so as to supply an easily-adhering property, in particular, a method (in-line coating method) of subjecting, optionally, a polyester film before the crystal orientation thereof is completed to corona discharge treatment, coating the film with a coating solution containing any one of the above-mentioned resin components, drying the resultant, and subjecting the dried matter to drawing and heating treatment to complete the crystal orientation.

However, the above-mentioned conventional techniques have problems as follows:

About the supply of adhesion, in, e.g., the method of forming an acrylic-modified polyurethane into a primer layer onto the surface of a film or the method of forming a copolymerized polyester into a primer layer, there is easily caused, for example, a problem that the adhesion to a UV curable resin is insufficient or adhesion after the film is stored in a wet heating environment (adhesion after wet heat aging) is not obtained at all. In the method wherein a crosslinking agent is positively used, for example, the method of forming a copolymerized polyester resin and an isocyanate crosslinking agent into a primer layer, or the method of using a carbodiimide crosslinking agent as a crosslinking agent in a primer layer, the effect of improving the adhesion after wet heat aging is recognized; however, in many cases, the adhesion thereof to UV curable resin, in particular, a solvent-free type UV curable resin which constitutes a prism lens layer, or some other resin is not yet sufficient.

About a functional film to which a unique surface shape is given, such as a prism lens layer, a lenticular layer or an optical diffusion layer, UV rays are radiated thereto from the side of a PET film thereon in the production of the film so as to cure the solvent-free type UV curable resin therefor in many cases. In particular, in the case of forming such functional films on both surfaces of the PET film, or in some other case, there remains a serious problem that original adhesion function is not expressed, such as a problem that a layer formed on the PET film is deteriorated by UV rays radiated when the UV curable resin on one of the surfaces is formed into a shape and cured, so that the adhesion to a solvent-free type UV curable resin that will be next formed onto the opposite surface is not obtained. Of course, not only in the case of forming the same UV curable resin on both the surfaces but also in the case of forming, for example, an adhesive agent on the opposite surface, the phenomenon that the easily-adhering layer is deteriorated by UV rays may cause a serious problem against product characteristics, in particular, durability.

Thus, it could be advantageous to provide a laminate film which is excellent not only in initial adhesion but also in other adhesions, in particular, adhesion after wet heat aging and adhesion after irradiation with UV rays, and further quite excellent in transparency and coating appearance.

SUMMARY

We therefore provide:
(1) A laminated film, comprising a thermoplastic resin film, and a laminating layer provided at least one surface of the thermoplastic resin film, and the laminating layer comprising an acrylic urethane copolymer resin (A), and a polyester resin (B), and a crosslinking agent (C),
the crosslinking agent (C) being an isocyanate crosslinking agent and/or a carbodiimide crosslinking agent, and the amount of the crosslinking agent (C) being from 5 to 70 parts by weight based on 100 parts by weight of the sum of the acrylic urethane copolymer resin (A) and the polyester resin (B).
(2) The laminated film according to item (1), in which polycaprolactone urethane is used in the acrylic urethane resin (A).
(3) The laminated film according to item (1) or (2), in which 0.1 to 5% by weight of N-methylolacrylamide as a crosslinking functional group is copolymerized with the acrylic resin component of the acrylic urethane copolymer resin (A).
(4) The laminated film according to any one of items (1) to (3), in which the crosslinking agent (C) is a crosslinking agent in which an isocyanate crosslinking agent and a carbodiimide crosslinking agent are used together.
(5) The laminated film according to any one of items (1) to (4), in which the crosslinking agent (C) is a polymeric crosslinking agent.
(6) The laminated film according to any one of items (1) to (5), in which the polyester resin (B) has a carboxyl group on its side chain.
(7) The laminated film according to any one of items (1) to (6), in which in the acrylic urethane copolymer resin (A), the acrylic component thereof constitutes a skin layer and the urethane thereof constitutes a core layer.
(8) The laminated film according to any one of items (1) to (7), in which the weight ratio of a solid in the acrylic urethane copolymer resin (A) to that in the polyester resin (B) in the laminating layer is from 95/5 to 60/40.
(9) The laminated film according any one of items (4) to (8), in which about the crosslinking agent (C), 10 to 40 parts by weight of the isocyanate crosslinking agent and 5 to 30 parts by weight of the carbodiimide crosslinking agent are used together for 100 parts by weight of the sum of the acrylic urethane copolymer resin (A) and the polyester resin (B).
(10) The laminated film according to any one of items (1) to (9), in which the thermoplastic resin film is a polyethylene terephthalate film or a polyethylene-2,6-naphthalate film.

The laminated films are excellent not only in initial adhesion but also in other adhesions, in particular, adhesion after wet heat aging and adhesion after irradiation with UV rays, and further quite excellent in transparency and coating appearance.

DETAILED DESCRIPTION

The thermoplastic resin film is a generic name of any film which is melted or softened by heat, and is not particularly limited. Typical examples of the film include polyester films, polyolefin films such as a polypropylene film and a polyethylene film, a polylactic acid film, a polycarbonate film, acrylic films such as a polymethyl methacrylate film and a polystyrene film, polyamide films such as nylon, polyvinyl chloride films, polyurethane films, fluorine-contained films, and polyphenylenesulfide films.

These may each be a homopolymer or a copolymer. Out of these, preferred are polyester, polypropylene, polyamide and other films from the viewpoint of mechanical property, dimension stability, transparency and so on. Particularly preferred is a polyester film from the viewpoint of mechanical property, multiusability and so on.

About the laminated film, a polyester film will be described hereinafter as a typical example thereof. However, this disclosure is not particularly limited.

About the polyester film which is preferably used as the laminated film, polyester is a generic name of any polymer having ester bonds as main bonding chains of its main chain. The following can be preferably used: a polyester containing, as a main constituent thereof, at least one constituent selected from ethylene terephthalate, propylene terephthalate, ethylene-2,6-naphthalate, butylene terephthalate, propylene-2,6-naphthalate, ethylene-α,β-bis(2-chloro-phenoxy)ethane-4,4'-dicarboxylate, and others. These constituents may be used alone or in combination of two or more thereof. Judging from overall viewpoints including quality and economical efficiency, particularly preferred is the use of a polyethylene containing, as its main constituent, ethylene terephthalate, that is, polyethylene terephthalate. When heat, shrinkage stress or the like acts on a base material, more preferred is polyethylene-2,6-naphthalate, which is excellent in heat resistance and rigidity. These polyesters may be further copolymerized with a different dicarboxylic acid component or a diol component in a part-constituting amount, preferably in an amount of 20% or less by mole.

Additives may be incorporated into this polyester to such a degree that characteristics thereof are not deteriorated, examples of the additives including an antioxidant, a heat resisting stabilizer, a weather resisting stabilizer, an ultraviolet absorber, an organic lubricant, a pigment, a dye, organic or inorganic fine particles, a filler, an antistatic agent, and a nucleus-forming agent.

The limiting viscosity of the polyester (measured in o-chlorophenol at 25° C.) is preferably from 0.4 to 1.2 dL/g, more preferably from 0.5 to 0.8 dL/g to carry out this disclosure.

When the polyester film using the polyester is in the state that a laminating layer overlays the film, the polyester film is preferably a biaxially oriented film. The biaxially oriented film is in general a film obtained by drawing a non-drawn polyester sheet or film in the longitudinal direction and the transverse direction at draw ratios of 2.5 to 5, respectively, and then subjecting the drawn film to heat treatment, thereby completing the crystal orientation thereof, and is a film exhibiting a biaxially oriented pattern according to wide-angle X-ray diffraction.

The thickness of the polyester film is not particularly limited, and is appropriately selected in accordance with the purpose for the use of the laminated film, or the kind thereof. From the viewpoint of mechanical strength, handleability and so on, usually, the thickness is preferably from 1 to 500 µm, more preferably from 5 to 250 µm, most preferably from 25 to 200 µm. Moreover, the polyester film substrate may be a composite film obtained by co-extrusion. In particular, when it is rendered a composite film of two or more layers, high lubricity and smoothness thereof are easily made compatible with each other while the transparency is kept in a manner of adding highly lubricant fine particles to its skin layer and adding no particles to its core layer, or in some other manner.

A product wherein obtained films are caused to adhere onto each other in various manners may be used.

The laminating layer is a film-form member formed to be laminated and be present onto a surface of the thermoplastic resin film, which is a substrate. The layer itself may be made of a single layer or plural layers.

The laminating layer in the laminated film is made of a composition comprising an acrylic urethane copolymer resin (A), a polyester resin (B), and a crosslinking agent (C) wherein the crosslinking agent (C) is an isocyanate crosslinking agent and/a carbodiimide crosslinking agent. The amount of the composition is preferably 50% or more by weight, more preferably 70% or more by weight, most preferably 80% or more by weight based on the sum of the laminating layer.

A polymer wherein an acrylic component and a urethane are copolymerized with each other is used from the viewpoint of the adhesion, and the UV resistance (the adhesion after irradiation with UV rays). The acryl urethane copolymer resin (A) used in the laminating layer in the laminated film is not particularly limited as long as the resin is a resin wherein an acrylic component and a urethane are copolymerized with each other. Particularly preferred is an acryl urethane copolymer resin wherein an acrylic component constitutes a skin layer and a urethane constitutes a core layer. In this case, it is preferred that the core layer is not in the state of being completely enclosed with the skin layer but in the state of being naked. Specifically, in the case that the core layer is in the state of being completely enveloped with the skin layer, a surface state having only characteristics of the acrylic component is obtained and a surface state having characteristics of the urethane originating from the core layer cannot easily be obtained when the resin is painted and dried to form a coat. On the other hand, the state that the core layer is not enveloped with the skin layer, that is, the state that the two are separated from each other is a state that the acrylic component and the urethane are merely mixed with each other. In general, the acrylic component, which is smaller in resin surface energy, is selectively positioned on the surface side; thus, when the resin is painted and dried to form a coat, the coat turns into a surface state having only characteristics of the acrylic component.

The acryl urethane copolymer resin having a core/skin structure may be obtained, for example, by conducting a first emulsion polymerization in a system of a monomer which will constitute the core moiety of the polymer resin, an emulsifier, a polymerization initiator, and water, adding a monomer which will constitute the shell moiety and a polymerization initiator thereto after the polymerization substantially finishes, and then conducting a second emulsion polymerization. To make the copolymer resin to be generated at this time into a bi-layered structure, it is effective that in the second emulsion polymerization, no emulsifier is added, or that even if an emulsifier is added, the amount thereof is controlled into such a degree that a new core is not formed. As a result, polymerization advances on the core surface of the copolymer resin formed by the first emulsion polymerization. In particular, a preferred aspect, wherein the core layer is not completely enveloped with the skin layer and the core layer is naked, can be produced by carrying out the following method in the above-mentioned producing process: a method of adjusting the amount of the charged emulsifier in the second emulsion polymerization, or of polymerizing, separately, a skin-layer-corresponding moiety to be supplied to the second emulsion polymerization, and further conducting the second emulsion polymerization on the core surface; or some other method.

The acryl urethane copolymer resin (A) may be obtained, for example, by: copolymerizing an acrylic monomer which constitutes the acrylic component in the presence of an aqueous urethane; copolymerizing an aqueous urethane and an aqueous acrylic component, in particular, an aqueous acrylic component having crosslinking functional groups; or copolymerizing an aqueous urethane and an aqueous acrylic component copolymer with each other through crosslinking functional groups of each of the resins, or through others. The aqueous urethane may be, for example, a urethane wherein a functional group for making the affinity with water high is introduced into an ordinary urethane resin, examples of the functional group including anionic functional groups such as a carboxylate group, a sulfonate group, and a half ester group of sulfuric acid; and cationic functional groups such as a quaternary ammonium salt group. Among these functional groups, anionic functional groups are preferred, and carboxylate and sulfonate groups are more preferred from the viewpoint of the dispersibility in water, and the easiness of reaction control during synthesis.

The introduction of the carboxylate group can be attained, for example, by: using a carboxylic acid group containing polyhydroxy compound as one component of polyhydroxy compounds which are starting materials in the urethane copolymerization; or reacting unreacted isocyanate groups of a urethane with a hydroxyl group containing carboxylic acid, or amino group containing carboxylic acid, and subsequently adding the reaction product to an aqueous alkaline solution with stirring at a high speed, thereby neutralizing the system.

The introduction of the sulfonate group or the half ester group of sulfuric acid can be attained, for example, by producing a prepolymer from a polyhydroxy compound, a polyisocyanate compound, and a chain extender, adding thereto a compound having, in the molecule thereof, an amino group or hydroxyl group capable of reacting with a terminal isocyanate group, and a sulfonate group or half ester group of sulfuric acid to cause these components to react with each other, thereby yielding finally an aqueous urethane having, in the molecule thereof, a sulfonate group or a half ester group of sulfuric acid. At this time, it is preferred to conduct the producing reaction in an organic solvent, adding water thereto, and then removing the organic solvent. A different method therefor is a method of using a compound having a sulfonic acid group as one out of raw materials to polymerize a urethane having sulfonic acid groups, and then adding the urethane to an aqueous alkaline solution with stirring at a high speed, so as to neutralize the system; a method of introducing an alkali salt of sulfonic acid (for example, a sulfonated sodium salt group) to a primary or secondary amino group of the main chain or side chain of a urethane in the presence of an alkali; or some other method. It is preferred to use, as the aqueous alkaline solution, an aqueous solution of sodium hydroxide, potassium hydroxide, ammonia, alkylamine or the like. Particularly preferred is ammonia, about which the alkali does not remain in the painted film after the film-forming liquid is painted and dried, an amine, which volatilizes under conditions that the liquid is dried into a solid, or the like. The amount of the salt group, such as the carbonate group, sulfonate group, or half ester group of sulfuric acid, is preferably from $0.5 \times 10^{-4}$ to $20 \times 10^{-4}$ eq./g, more preferably $1 \times 10^{-4}$ to $10 \times 10^{-4}$ eq./g. If the proportion of the salt group is too small, the affinity of the urethane with water is insufficient so that an aqueous dispersion is not easily prepared. If the proportion is too large, original characteristics of the urethane are damaged. Thus, the cases are not favorable. Of course, the aqueous urethane is a material which constitutes a stable aqueous dispersion or an aqueous solution by optional use of a dispersion aiding agent.

As the polyhydroxy compound used in the synthesis of the urethane, for example, the following may be used: polyethylene glycol, polypropylene glycol, polyethylene/propylene glycol, polytetramethylene glycol, hexamethylene glycol, tetramethylene glycol, 1,5-pentanediol, diethylene glycol, triethylene glycol, polycaprolactone, polyhexamethylene adipate, polyhexamethylene sebacate, polytetramethylene adipate, polytetramethylene sebacate, trimethylolpropane, trimethylolethane, pentaerythritol, or glycerin.

Particularly preferred is a dispersion or solution wherein polycaprolactone is used as the polyhydroxy compound. In this case, the coating appearance when the dispersion or solution is painted on a film is excellent.

As the polyisocyanate compound, for example, the following may be used: hexamethylene diisocyanate, diphenylmethane diisocyanate, tolylene diisocyanate, isophorone diisocyanate, an adduct of tolylene diisocyanate and trimethylolpropane, or an adduct of hexamethylene diisocyanate and trimethylolethane. As the carboxylic acid containing polyol, there may be used, for example, dimethylolpropionic acid, dimethylollactic acid, dimeth-ylolbutyric acid, or a bis (ethylene glycol) ester of trimellitic acid.

As the amino group containing carboxylic acid, there may be used, for example, β-aminopropionic acid, γ-aminobutyric acid, or P-aminobenzoic acid. As the hydroxyl group containing carboxylic acid, there may be used, for example, 3-hydroxypropionic acid, γ-hydroxybutyric acid, P-(2-hydroxyethyl)benzoic acid, or malic acid.

As the compound having an amino or hydroxyl group and a sulfonic group, there may be used, for example, aminomethanesulfonic acid, 2-aminoethanesulfonic acid, 2-amino-5-methylbenzene-2-sulfonic acid, sodium β-hydroxyethanesulfonate, a propane sultone adduct of an aliphatic di(primary amine) compound, or a butane sultone adduct. Preferred is a propane sultone adduct of an aliphatic di(primary amine) compound.

As the compound containing an amino or hydroxyl group and a half ester of sulfuric acid, there may used, for example, aminoethanol sulfuric acid, ethylene diamine ethanol sulfuric acid, aminobutanol sulfuric acid, hydroxyethanol sulfuric acid, γ-hydroxypropanol sulfuric acid, or α-hydroxybutanol sulfuric acid.

The polymerization of urethanes using these compounds may be according to methods that have been hitherto used.

As the acrylic monomer used in the acrylic urethane copolymer resin (A), for example, the following may be used: alkyl acrylates (the alkyl group being methyl, ethyl, n-propyl, n-butyl, isobutyl, t-butyl, 2-ethylhexyl, cyclohexyl or the like), alkyl methacrylates (the alkyl group being methyl, ethyl, n-propyl, n-butyl, isobutyl, t-butyl, 2-ethylhexyl, cyclohexyl or the like), hydroxyl containing monomers such as 2-hydroxyethyl acrylate, 2-hydroxyethyl methacrylate, 2-hydroxypropyl acrylate and 2-hydroxypropyl methacrylate, amide group containing monomers such as acrylamide, methacrylamide, N-methylmethacrylamide, N-methylacrylamide, N-methylolacrylamide, N-methylolmethacrylamide, N,N-dimethylolacryl-amide, N-methoxymethylacrylamide, N-methoxymethylmethacrylamide and N-phenylacrylamide, amino group containing monomers such as N,N-diethylaminoethyl acrylate and N,N-diethylaminoethyl methacrylate, glycidyl group containing monomers such as glycidyl acrylate and glycidyl methacrylate, and monomers containing a carboxyl group or a salt thereof, such as acrylic acid, methacrylic acid and salts thereof (such as sodium, potassium, and ammonium salts). It is preferred to copolymerize a crosslinking functional group, and it is particularly preferred to copolymerize, in particular, N-methylolacrylamide from the viewpoint of the self-crosslinkable property and an improvement in the crosslinkage density. The copolymerization ratio of N-methylolacrylamide is preferably from 0.5 to 5% by weight from the viewpoint of the copolymerizability and the crosslinking degree. The ratio is more preferably from 1 to 3% by weight, considering, in particular, the coating appearance. If the ratio is less than 0.5% by weight, for example, the adhesion after wet aging tends to be poor. If the ratio is more than 5% by weight, for example, the stability of the aqueous dispersion of the resin tends to be poor or the coating appearance tends to deteriorate.

These may each be used together with a different monomer. Examples of the different monomer that may be used include glycidyl group containing monomers such as allyl glycidyl ether, monomers containing a sulfonic acid group or a salt thereof, such as styrenesulfonic acid, vinylsulfonic acid, and salts thereof (such as sodium, potassium, and ammonium salts thereof), monomers containing a carboxyl group or a salt thereof, such as crotonic acid, itaconic acid, maleic acid, fumaric acid, and salts thereof (such as sodium, potassium, and ammonium salts), monomers containing an acid anhydride, such as maleic anhydride and itaconic anhydride, vinyl isocyanate, allyl isocyanate, styrene, vinyl methyl ether, vinyl ethyl ether, vinyltrisalkoxysilane, an alkyl monoester of maleic acid, an alkyl monoester of fumaric acid, acrylonitrile, methacrylonitrile, an alkyl monoester of itaconic acid, vinylidene chloride, vinyl acetate, vinyl chloride, and vinylpyrrolidone.

About the acrylic monomer, one or more species thereof are used and polymerized. When the different monomer is used together, the ratio of the acrylic monomer in all the monomers is preferably 50% or more, more preferably 70% or more.

The glass transition temperature (Tg) of the acrylic resin which constitutes the acrylic urethane copolymer resin (A) is preferably 20° C. or higher, more preferably 40° C. or higher. If this glass transition temperature is lower than 20° C., the heat resistance is insufficient so that, for example, blocking tends to be easily generated even at room temperature.

The ratio of the "acrylic resin/the urethane" in the acrylic urethane copolymer resin (A) is preferably from "10/90" to "70/30," more preferably from "20/80" to "50/50." If the ratio of the acrylic resin is less than 10/90, the adhesion of the laminating layer, which is obtained after the dispersion or solution is painted and dried, tends to get worse after deterioration by UV rays. If the ratio is more than 70/30, the ratio of the surface of the laminating layer covered with the acrylic component becomes large. Thus, the initial adhesion tends to get worse. The ratio by weight of the acrylic resin/the urethane can be made into a desired value by adjusting the blended amounts of the raw materials when the acrylic urethane copolymer resin (A) is produced.

The method for producing the acryl urethane copolymer resin (A) is, for example, a method of adding, to the above-mentioned aqueous dispersion of the aqueous urethane, small amounts of a dispersing agent and a polymerization initiator, adding the above-mentioned acrylic monomer gradually thereto while the system is kept into a constant temperature and stirred, and subsequently continuing reaction for a predetermined period while the temperature is optionally raised, thereby completing the polymerization of the acrylic monomer to yield the resin (A) in the form of an aqueous dispersion of the acrylic urethane copolymer resin. However, the method is not limited thereto.

The polyester resin (B) that can be used in the laminating layer in the laminated film is a resin which has, in its main chain or side chains, ester bonds and is obtained by polycondensing a dicarboxylic acid and a diol.

As the carboxylic acid component which constitutes the polyester resin, there may be used an aromatic, aliphatic or alicyclic dicarboxylic acid or polycarboxylic acid, which is a trivalent or higher-valent acid.

Examples of the aromatic dicarboxylic acid that can be used include terephthalic acid, isophthalic acid, orthophtalic acid, phthalic acid, 2,5-dimethylterephthalic acid, 1,4-naphthalenedicarboxylic acid, biphenyldicarboxylic acid, 2,6-naphthalenedicarboxylic acid, 1,2-bisphenoxyethane-p,p'-dicarboxylic acid, and phenylindanedicarboxylic acid. From the viewpoint of the strength and heat resistance of the laminating layer, these aromatic dicarboxylic acids are each used preferably in an amount of 30% or more by mole based on all the dicarboxylic acid components, more preferably in an amount of 35% or more by mole thereon, most preferably in an amount of 40% or more by mole thereon.

Examples of the aliphatic and alicyclic dicarboxylic acid that can be used include succinic acid, adipic acid, sebacic acid, azelaic acid, dodecanedioic acid, dimer acid, 1,3-cyclopentanedicarboxylic acid, 1,2-cyclohexanedicarboxylic acid, and 1,4-cyclohexane-dicarboxylic acid; and ester-formable derivatives thereof.

Examples of the glycol component of the polyester resin that can be used include ethylene glycol, diethylene glycol, polyethylene glycol, propylene glycol, polypropylene glycol, 1,3-propanediol, 1,3-butanediol, 1,4-butanediol, 1,5-pentanediol, 1,6-hexanediol, 1,7-heptane-diol, 1,8-octanediol, 1,9-nonanediol, 1,10-decanediol, 2,4-dimethyl-2-ethylhexane-1,3-diol, neopentyl glycol, 2-ethyl-2-butyl-1,3-propanediol, 2-ethyl-2-isobutyl-1,3-propanediol, 3-methyl-1,5-pentanediol, 2,2,4-trimethyl-1,6-hexanediol, 1,2-cyclohexanedimethanol, 1,3-cyclohexane-dimethanol, 1,4-cyclohexanedimethanol, 2,2,4,4-tetramethyl-1,3-cyclobutanediol, 4,4'-thiodiphenol, bisphenol A, 4,4'-methylenediphenol, 4,4'-(2-norbornylidene)diphenol, 4,4'-dihydroxy-biphenol, o-, m-, and p-dihydroxybenzene, 4,4'-isopropylidenephenol, 4,4'-isopropylidenediol, cyclopentane-1,2-diol, cyclohexane-1,2-diol, and cyclohexane-1,4-diol.

When the polyester resin is made into an aqueous liquid and the solution is used as a liquid paint, it is preferred to copolymerize a compound containing a sulfonate group, or a compound containing a carboxylate group in order to make the polyester resin water soluble or water dispersible with ease.

Examples of the carboxylate group containing compound include trimellitic acid, trimellitic anhydride, pyromellitic acid, pyromellitic anhydride, 4-methylcyclohexene-1,2,3-tricarboxylic acid, trimesic acid, 1,2,3,4-butanetetracarboxylic acid, 1,2,3,4-pentanetetra-carboxylic acid, 3,3',4,4'-benzophenonetetracarboxylic acid, 5-(2,5-dioxotetrahydrofurfuryl)-3-methyl-3-cylohexene-1,2-dicarboxylic acid, 5-(2,5-dioxotetrahydrofurfuryl)-3-cyclohexene-1,2-dicarboxylic acid, cyclopentanetetracarboxylic acid, 2,3,6,7-naphthalenetetracarboxylic acid, 1,2,5,6-naphthalene tetracarboxylic acid, ethylene glycol bistrimellitate, 2,2',3,3'-diphenyl-tetracarboxylic acid, thiophene-2,3,4,5-tetracarboxylic acid, and ethylenetetracarboxylic acid; and alkali metal salts, alkaline earth metal salts, and ammonium salts thereof. However, the compound is not limited thereto. Particularly preferred is a method of using trimellitic acid and introducing carboxylic groups into the side chains. The copolymerization ratio thereof is not particularly limited, and is preferably from 5 to 30% by mole, more preferably from 5 to 20% by mole. When the ratio is set into this range, excellent advantageous effects are produced to make the polyester resin water dispersible, make points for crosslinkage with a different crosslinking agent, restrain the hydrolysis resistance, and attain other purposes.

Examples of the sulfonate group containing compound that can be used include sulfoterephthalic acid, 5-sulfoisophthalic acid, 4-sulfoisophthalic acid, 4-sulfonaphthalene-2,7-dicarboxylic acid, sulfo-p-xylylene glycol, and 2-sulfo-1,4-bis(hydroxyethoxy)benzene; and alkali metal salts, alkaline earth metal salts, and ammonium salts thereof. However, the compound is not limited thereto.

A preferred example of the polyester resin is a copolymer using an acid component selected from terephthalic acid, isophthalic acid, sebacic acid, and 5-sodiumsulfoisophthalic acid, and a glycol component selected from ethylene glycol, diethylene glycol, 1,4-butanediol, and neopentyl glycol. When adhesion after wet heat aging and water resistance are required, a copolymer using trimellitic acid as the copolymer component thereof instead of 5-sodium-sulfoisophthalic acid, or some other copolymer can also be preferably used.

In the laminated film, the polyester resin used in the laminating layer can be produced by a producing process described below. For example, described is the polyester resin using, as a dicarboxylic acid component, terephthalic acid, isophthalic acid or 5-sodiumsulfoisophthalic acid, and using, as a glycol component, ethylene glycol or neopentyl glycol. The polyester resin can be produced by a production method based on: a first step of causing direct esterification reaction between terephthalic acid, isophthalic acid or 5-sodiumsulfoisophthalic acid and ethylene glycol or neopentyl glycol, or transesterification reaction between terephthalic acid, isophthalic acid or 5-sodiumsulfoisophthalic acid and ethylene glycol or neopentyl glycol; and a second step of causing polycondensation reaction of the reaction product in the first step, or some other method.

At this time, it is allowable to use, as a reaction catalyst, for example, an alkali metal, an alkaline earth metal, manganese, cobalt, zinc, antimony, germanium, or a titanium compound.

A method for obtaining the polyester resin having a large amount of a carboxylic acid on its terminals and/or its side chains may be a production method of copolymerizing a polycarboxylic acid, which is a trivalent or higher polycarboxylic acid, described in JP-A-54-46294, 60-209073, 62-240318, 53-26828, 53-26829, 53-98336, 56-116718, 61-124684 or 62-240318, or some other document. Of course, a method other than these methods may be used.

The intrinsic viscosity of the polyester resin used in the laminating film is not particularly limited. From the viewpoint of adhesion, the viscosity is preferably 0.3 dL/g or more, more preferably 0.35 dL/g or more, most preferably 0.4 dL/g or more. The glass transition point (hereinafter abbreviated to "Tg") of the polyester resin is preferably from 0 to 130° C., more preferably from 10 to 85° C. If the Tg is lower than 0° C., for example, the heat resisting adhesion is poor or a blocking phenomenon that the laminating film sticks onto the same laminating film is caused. On the other hand, if the Tg is higher than 130° C., the stability of the resin or water dispersibility thereof may be unfavorably poor.

It is allowable to use, as the resins which constitute the laminating film, not only the acryl urethane copolymer resin (A) and the polyester resin (B) but also an acrylic resin, a polyester resin different from the polyester resin (B), a urethane resin and/or some other resin. Three or more of these resins may be used.

Examples of the isocyanate crosslinking agent that can be used in the laminating layer in the laminated film include tolylene diisocyanate, diphenylmethane-4,4'-diisocyanate, m-xylylene diisocyanate, hexamethylene-1,6-diisocyanate, 1,6-diisocyanate hexane, an adduct of tolylene diisocyanate and hexanetriol, an adduct of tolylene diisocyanate and trimethylolpropane, polyol-modified diphenylmethane-4,4'-diisocyanate, carbodiimide-modified diphenylmethane-4,4'-diisocyanate, isophorone diisocyanate, 1,5-naphthalene diisocyanate, 3,3'-bitolylene-4,4' diisocyanate, 3,3' dimethyldiphenylmethane-4,4'-diisocyanate, and m-phenylene diisocyanate. Particularly preferred is the use of a polymeric isocyanate crosslinking agent wherein a polyester resin, an acrylic resin or some other resin has, on its terminals or side chains, plural isocyanate groups since the flexibility or the toughness of the laminating layer becomes high.

When an aqueous paint is used as the liquid paint for forming the laminating layer, a blocked isocyanate compound, wherein an isocyanate group is masked with a blocking agent or the like, can be preferably used from the viewpoint of the pot lifetime of the paint and others since the isocyanate group reacts easily with the water. In a typical system thereof, the blocking agent is volatilized by heat in heating and drying steps after the agent is painted, so that the isocyanate group is made naked to cause crosslinking reaction. The isocyanate group may be of a monofunctional type or of a polyfunctional type. A polyfunctional type blocked polyisocyanate compound can be preferably used since the compound easily makes the crosslinkage density higher.

The blocked polyisocyanate compound that can be used may be a low molecular weight compound or high molecular weight compound which has two or more blocked isocyanate groups and is represented by the following general formula (I):

[Formula 1]

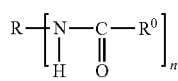
(I)

wherein —$R^0$ is a group represented by —$OR^1$, —$N=CR^2R^3$, —$NR^4R^5$, —$SR^6R^7R^8$ and $SiR^9R^{10}R^{11}$, R is an organic residue, and n is an integer of 2 to 4. The blocked isocyanate group in the [ ] in the formula (I) is heated to be decomposed into an isocyanate group represented by a formula (II) illustrated below, and this isocyanate group is bonded to an active hydrogen in other resin components which constitute the laminating layer, whereby crosslinkage is advanced so that the adhesion, the adhesion after wet aging and others are improved. The active hydrogen is a hydrogen element contained in a hydroxyl group (—OH), a carboxyl group (—COOH), or some other group.

[Formula 2]

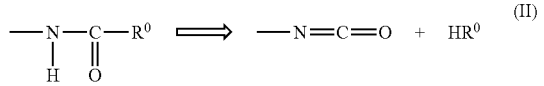
(II)

Examples of the blocked isocyanate group are represented by the following formula (I-1) to (I-5):

[Formula 3]

(I-1)

wherein $R^1$ is an aliphatic hydrocarbon group, alicyclic hydrocarbon group or aromatic hydrocarbon group having 1 to 20 carbon atom(s).

[Formula 4]

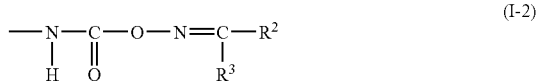
(I-2)

wherein $R^2$ and $R^3$ are each an aliphatic hydrocarbon group having 1 to 7 carbon atom(s), or a sulfinate group (—$SO_2M$ wherein M is an alkali metal).

[Formula 5]

(I-3)

wherein $R^4$ and $R^5$ are each a hydrogen element or an aliphatic hydrocarbon group, alicyclic hydrocarbon group or aromatic hydrocarbon group having 1 to 20 carbon atom(s), and $R^4$ to $R^5$ may be a lactam ring bonded thereto.

[Formula 6]

(I-4)

wherein $R^6$, $R^7$ and $R^8$ are each a hydrogen element or an aliphatic hydrocarbon group, alicyclic hydrocarbon group or aromatic hydrocarbon group having 1 to 20 carbon atom(s), and $R^6$ to $R^7$ may be a mercaptan ring bonded thereto.

[Formula 7]

(I-5)

wherein $R^9$, $R^{10}$ and $R^{11}$ are each a hydrogen atom, an aliphatic hydrocarbon group having 1 to 5 carbon atom(s), or a group represented by —$OR^{12}$ wherein $R^{12}$ is an aliphatic hydrocarbon group having 1 to 4 carbon atom(s).

Examples of the low molecular weight or high molecular weight compound that can be used, which has two or more blocked isocyanate groups, include diphenylmethane diisocyanate, tolylene diisocyanate, hexamethylene diisocyanate, an adduct wherein tolylene diisocyanate is added to trimethylolpropane at an amount of 3 moles per mole, polyvinyl isocyanate, vinyl isocyanate copolymer, polyurethane-terminated diisocyanate, tolylene diisocyanate blocked with oxime, hexamethylene diisocyanate blocked with sodium hydrosulfite, polyurethane-terminated diisocyanate blocked with methyl ethyl ketone oxime, and a phenol-blocked adduct wherein tolylene diisocyanate is added to trimethylolpropane at an amount of 3 moles per mole.

The carbodiimide crosslinking agent that can be used in the laminating layer in the laminated film is not particularly limited as long as the agent is, for example, a compound having at least one carbodiimide structure represented by a general formula (1) illustrated below per molecule thereof. From the viewpoint of adhesion after wet heat aging and others, particularly preferred is a polycarbodiimide crosslinking agent having, in a single molecule thereof, two or more. In the case of using, particularly, a polymeric isocyanate crosslinking agent having plural carbodiimide groups at terminals or side chains of a polymer such as polyester resin or acrylic resin, the flexibility or the toughness of the laminating layer becomes high. Thus, the use is preferred.

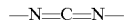 (1)

A known technique can be applied to the production of the polycarbodiimide crosslinking agent. For example, a method described in JP-B-47-33279 or JP-A-09-235508 may be used. In general, the agent is obtained by polycondensing a diisocyanate compound in the presence of a catalyst. The diisocyanate compound, which can be used as the starting material of the polycarbodiimide crosslinking agent, may be an aromatic, aliphatic or alicyclic diisocyanate, or the like. Specific examples thereof which can be used include tolylene diisocyanate, xylene diisocyanate, diphenylmethane diisocyanate, hexamethylene diisocyanate, cyclohexane diisocyanate, isophorone diisocyanate, and dicyclohexyl diisocyanate. To improve the water solubility or the water dispersibility of the polycarbodiimide crosslinking agent, a surfactant may be added or a hydrophilic monomer may be added as long as the advantageous effects are not caused to disappear, an example of the monomer being a polyalkylene oxide, a quaternary ammonium salt of a dialkylaminoalcohol, or a hydroxyalkylsulfonic acid.

An isocyanate crosslinking agent and/or a carbodiimide crosslinking agent is used as the crosslinking agent (C). In addition to the crosslinking agent(s), the following different cross-linking agent may be used: for example, a melamine crosslinking agent, an epoxy crosslinking agent, an aziridine crosslinking agent, an amideepoxy compound, a titanium coupling agent such as titanium chelate, an oxazolin crosslinking agent, an isocyanate crosslinking agent, a methylolated or an alkylolated urea compound, or an acrylamide compound.

About the weight ratio between solids in the laminating layer in the laminated film, the ratio of the "acryl urethane copolymer resin (A)/the polyester resin (B)" is "95/5" to "60/40," more preferably "90/10" to "60/40," most preferably "80/20" to "70/30" from the viewpoint of adhesion, in particular, adhesion after irradiation with UV rays.

About the weight ratio of the solids in the laminating layer in the laminate film, it is necessary that the amount of the crosslinking agent (C) is from 5 to 70 parts by weight based on 100 parts by weight of the sum of the acrylic urethane copolymer resin (A) and the polyester resin (B). If the added amount of the crosslinking agent (C) is less than 5 parts by weight or more than 70 parts by weight, the adhesion after wet heat aging or the adhesion after irradiation with UV rays deteriorates. The added amount of the crosslinking agent (C) is preferably from 15 to 70 parts by weight, more preferably from 25 to 45 parts by weight. When this added amount is used, the adhesion, the adhesion after wet aging, the adhesion after irradiation with UV rays, and coating appearance become very good.

As the crosslinking agent (C), an isocyanate crosslinking agent and/or a carbodiimide crosslinking agent is/are used. The use of the two is particularly preferred. The sum added amount is as described above, and the amount of the acrylic urethane copolymer resin (A) and that of the polyester resin (B) are preferably from 10 to 40 parts by weight and from 5 to 30 parts by weight, respectively, based on 100 parts by weight of the sum of the acrylic urethane copolymer resin (A) and the polyester resin (B), and are more preferably, from the viewpoint of the adhesion after irradiation with UV rays, from 15 to 30 parts by weight and from 5 to 20 parts by weight, respectively. When the amount of the carbodiimide crosslinking agent is from 5 to 20 parts by weight, most preferably from 10 to 20 parts by weight, a laminate film very excellent in transparency as well as the above-mentioned adhesions can be produced.

Various additives may be incorporated into the laminating layer as long as the advantageous effects are not damaged, examples of the additives including an antioxidant, a heat resisting stabilizer, a weather resisting stabilizer, an ultraviolet absorbent, an organic lubricant, a pigment, a dye, organic or inorganic fine particles, a filler, an antistatic agent, and a nucleus-forming agent.

The laminating layer obtained by adding/incorporating inorganic particles into the liquid paint and subjecting the resultant to biaxial drawing is more preferred since the lubricity is improved.

For the inorganic particles to be added, silica, colloidal silica, alumina, alumina sol, kaolin, talc, mica, calcium carbonate or the like may be typically used. The used inorganic particles may be of any kind as long as the advantageous effects are not damaged. About the particles added to the laminating layer, the average particle diameter thereof is preferably from 0.005 to 0.3 μm, more preferably from 0.02 to 0.15 μm, most preferably from 0.04 to 0.1 μm. The proportion of its solids to 100 parts by weight of the sum of the acrylic urethane copolymer resin (A) and the polyester resin (B) is not particularly limited, and the proportion by weight is preferably from 0.05 to 20 parts by weight, more preferably from 0.1 to 10 parts by weight.

The haze of the laminated film is preferably 3% or less, more preferably 2% or less; most preferably 1% or less. If the haze is more than 3%, the laminated film gets largely cloudy when used as an optical film for a display or the like. Thus, for example, the display unfavorably becomes clouded or the resolution unfavorably becomes low. In the meantime, when the laminated film is used for a diffusion film or the like, the haze is not particularly limited.

Examples of a usable method for applying the aqueous resin(s) include reverse coating, spray coating, bar coating, gravure coating, rod coating, and die coating.

The thickness of the laminating layer is not particularly limited, and is usually from 0.005 to 0.2 μm, more preferably from 0.01 to 0.1 μm, most preferably from 0.01 to 0.08 μm. If the thickness of the laminating layer is too small, the adhesion may become poor.

When the laminated film is produced, a preferred method for forming the laminating layer is most suitably a method in which during the production of a polyester film, the laminating layer is applied and the layer is drawn together with the base film. For example, the laminated film can be obtained by the following method (in-line coating method): a melt-extruded polyester film before subjected to crystal orientation is drawn about 2.5-5 times in the longitudinal direction, and then a liquid paint is continuously applied onto the monoaxially drawn film; while the film applied is passed through zones that are stepwise heated, the film is dried and drawn about 2.5-5 timers in the width direction; and furthermore, the film is continuously introduced into a heating zone of 150 to 250° C. temperature, so as to complete the crystal orientation. The liquid paint used in this case is preferably an aqueous paint from the viewpoint of environmental pollution and explosion prevention. Biaxial co-drawing or the like may be adopted wherein a liquid paint is applied onto a non-drawn film and then the resultant is simultaneously drawn in the length and width directions. In this case, the film less contacts rolls so that the film is not easily injured. Thus, the method is of precedence.

It is preferred to subject a surface of the base film (the monoaxially drawn film or non-drawn film in the case of the above-mentioned example) to corona discharge treatment or the like before the liquid paint is applied thereon, so as to set the wet tensile force of the surface preferably to 47 mN/m or more, more preferably to 50 mN/m or more since the adhesion of the laminating film onto the base film can be improved. It is also preferred to incorporate, into the liquid paint, an organic solvent such as isopropyl alcohol, butylcellosolve, or N-methyl-2-pyrrolidone in a slight amount, thereby improving the wettability and the adhesion onto the base film.

The following will describe the production process of the laminated film in more detail about an example wherein polyethylene terephthalate (hereinafter abbreviated to "PET") is used as a base film. However, the process is not limited thereto.

The production process of the laminated film is more specifically described by way of examples. PET pellets having a limiting viscosity of 0.5 to 0.8 dL/g are vacuum-dried, and then supplied to an extruder and melted at 260 to 300° C. so as to be extruded from a T-shaped mouthpiece into a sheet form. An electrostatic casting method is used to wind the workpiece onto a mirror plane casting drum having a surface temperature of 10 to 60° C. and cool/solidify the workpiece. In this way, a non-drawn PET film is produced. This non-drawn film is drawn 2.5-5 times in the longitudinal direction (the film-advancing direction) between rolls heated to 70 to 120° C. At least one surface of this film is subjected to corona discharge treatment to set the wet tensile force of the surface to 47 mN/m or more. The aqueous liquid paint is applied onto the treated surface. The applied film is grasped with a clip, and introduced into a hot wind zone heated to 70 to 150° C. so as to be dried. The resultant is then drawn 2.5-5 times in the width direction, and subsequently introduced into a heat treatment zone of 160 to 250° C. of temperature so as to be subjected to heat treatment for 1 to 30 seconds, thereby completing the crystal orientation thereof. In this heat treatment step, the workpiece may be optionally subjected to treatment for relaxation by 1 to 10% in the width or longitudinal direction. The biaxial drawing may be longitudinally and transversely successive drawing, or biaxial co-drawing. The workpiece may be re-drawn in any one of the longitudinal direction and the transverse direction after drawn into the longitudinal direction or the transverse direction. The thickness of the polyester film is not particularly limited, and is preferably from 1 to 500 μm.

When at least one material selected from the composition for forming the laminating layer, and a reaction product of the laminating layer forming composition is incorporated into the base film on which the laminating layer is formed, the adhesion between the laminating layer and the base film can be improved or the lubricity can be improved. The sum added amount of the laminating layer forming composition and/or the reaction product thereof is preferably 0.0005% or more by weight and less than 20% by weight from the viewpoint of the adhesion and the lubricity. Considering, in particular, environmental protection and productivity, preferred is a method using regenerated pellets containing the laminating layer forming composition.

The thus-obtained laminated film is excellent only in initial adhesion but also in adhesion after wet aging and adhesion after irradiation with UV rays, and is further excellent in transparency. The film can be preferably used particularly for an easily-adhering film for optics, which is used for displays such as a liquid crystal television, a plasma television and a rear projection television; or for an easily-adhering film excellent in adhesion to various adherends.

EXAMPLES

Property-Measuring Methods and Effect-Evaluating Methods

Property-measuring methods and effect-evaluating methods are as follows.
(1) Thickness of Laminating Layer A cross section of a sample, for example, a laminate polyester film was cut off into the form of an ultra-thin slice. According to a staining ultramicrotomy based on $RuO_4$-staining, $OsO_4$-staining, or double staining of the two, the slice was observed and photographed with a TEM (transmission electron microscope). From a photograph of the cross section, the thickness of the laminating layer was measured. An average of measured values at 10 points in a measuring visual field was used.

Observing Method
    Device: transmission electron microscope (H-7100FA model, manufactured by Hitachi Ltd.)
    Measuring conditions: acceleration voltage of 100 kV
    Sample preparation: ultramicrotomy
    Observing magnifications: 200000
(2) Adhesion (Adhesion Under Normal Conditions)

To evaluate extensive ink adhesions of laminated films under normal conditions, the evaluations were made using various types of inks or paints. As printing inks, an ultraviolet curable ink (ink A) and an oxidation polymerizable ink (ink B) were used, and further an ultraviolet curable hard coat agent of organic solvent paint type (ink C) and a solvent-free type ultraviolet curable resin (ink D) were used (4 inks described below).

Ink A: "BESTCURE" 161 black (T & K Toka Co.)
    Ink B: HS ink (HS—OS) manufactured by Kuboi Ink Co., Ltd.
    Ink C: Hard coat agent (prepared to have the following composition proportions)
        Dipentaerythritol hexaacrylate: 70 parts by weight
        N-vinylpyrrolidone: 30 parts by weight
        1-Hydroxycyclohexyl phenyl ketone: 4 parts by weight
    Ink D: Solvent-free type transparent ultraviolet curable resin (prepared to have the following composition proportions)
        "SUNRAD" RC-610 manufactured by Sanyo Chemical Industries. Ltd.: 60 parts by weight
        "DIABEAM" UR-6530 manufactured by Mitsubishi Rayon Co., Ltd.: 20 parts by weight
        DPHA manufactured by Nippon Kayaku Co., Ltd.: 20 parts by weight About the ink A, the ink was applied into a thickness of about 1.5 μm on some of the laminating layers by roll coating. Thereafter, an ultraviolet lamp having a radiation intensity of 120 W/cm was used to radiate UV rays at a radiation distance (distance between the lamp and the ink surface) of 12 cm, a conveyer speed of 6 m/minute, and a totalized intensity of about 200 mJ/cm$^2$ so as to cure the ultraviolet curable ink. The adhesion thereof was evaluated by the following method:

The cured film of the ultraviolet curable ink was cut into 100 squares of 1 mm$^2$ area, and a Cellophane Tape (registered trade name) manufactured by Nichiban Co., Ltd. was stuck thereonto. A rubber roller was used, and reciprocated thereon 3 times so as to be pressed thereon at a load of 19.6 N. Thereafter, the tape was peeled off in a 90-degree direction. According to the number of the remaining squares in the cured film, evaluation was made into 4 ranks (very good: 100, good: 80-99, allowable: 50-79, and unallowable: 0-49). Ranks "very good" and "good" were judged to be good in adhesion.

About the ink B, the ink was applied into a thickness of about 1.5 μm onto some of the laminating layers. Thereafter, the resultants were each allowed to stand still under normal conditions for 24 hours, so as to be cured. The adhesion thereof was evaluated by the above-mentioned method.

About the ink C, a bar coater was used to apply the ink into a film thickness of 5 μm after the ink was cured. Thereafter, an ultraviolet lamp having a radiation intensity of 120 W/cm was used to radiate UV rays at a radiation distance (distance between the lamp and the ink surface) of 12 cm, a conveyer speed of 2 m/minute, and a totalized intensity of about 550 mJ/cm$^2$ so as to cure the hard coat layer. The adhesion thereof was evaluated by the above-mentioned method.

About the ink D, the ink was applied into a thickness of about 25 μm by wire bar coating. Thereafter, an ultraviolet lamp having a radiation intensity of 120 W/cm was used to radiate UV rays at a radiation distance (distance between the lamp and the ink surface) of 12 cm, a conveyer speed of 2 m/minute, and a totalized intensity of about 550 mJ/cm$^2$ so as to cure the solvent-free type transparent ultraviolet curable resin. The adhesion thereof was evaluated by the above-mentioned method.

(3) Adhesion after Wet Heat Aging

The samples onto which the ink D was applied were each allowed to stand still at 70° C. and a relative humidity of 90% for 240 hours. About the resultants, the above-mentioned adhesion evaluation was made.

(4) Adhesion after Irradiation with UV Rays

Except that before the applying of the ink D in the item (2) the laminating layer surfaces of the laminated films were irradiated with UV rays under conditions equal to curing conditions after the painting and subsequently the ink D was applied, the adhesions were evaluated in the same way.

(5) Adhesion after Wet Heat Aging after Irradiation with UV Rays

About the evaluating samples obtained in the item (4), the adhesions after wet heat aging thereof were evaluated under the same conditions as in the item (3).

(6) Transparency

As indexes of transparency, haze and overall light ray transmittance were used. In the measurement of the haze and the overall light ray transmittance, each of the laminated films was allowed to stand still under normal conditions (23° C., and a relatively humidity of 65%) for 2 hours. The measurement was then made using a fully automatic, direct-reading haze computer "HGM-2DP" manufactured by Suga Test Instruments Co., Ltd. The average of values obtained by making the measurement three times was used as the haze value.

(7) Glass Transition Temperature (Tg)

The temperature was measured by means of an SSC 5200 Disc Station manufactured by Seiko Instruments Inc. and connected to a robot DSC (differential scanning calorimeter) RDC 220 manufactured by Seiko Instruments Inc. Conditions for the measurement with the DSC are as follows: 10 mg of a sample was prepared onto an aluminum pan, and then the resultant was set to the DSC device (reference: an aluminum pan of the same type in which no sample was put); the pan was heated at a temperature of 300° C. for 5 minutes; liquid nitrogen was used to subject the pan to rapidly cooling treatment; the temperature of this sample was raised at 10° C./minute; and the glass transition temperature (Tg) was detected from a DSC chart thereof. As the glass transition temperature (Tg), midpoint glass transition temperature (Tmg) in JIS K7121-1987 was used.

(8) Coating Appearance

About the applied surfaces of the laminated films, the coating appearances thereof were examined by a method described below, using a three-wavelength type fluorescent lamp as a light source in a dark room. Among the films, a film to which an evaluation of "3" or more was given was judged to be usable. Unevenness about the applied layers is as follows: a slight coat thickness variation in one or more of the applied layers, or the like gave an irregular pattern in a stripe form; and this was detected as unevenness. The unevenness was more clearly observed, in particular, by the examination through reflected light rather than that through transmitted light. Thus, the former method was adopted.

<Unevenness of the Applied Layers Through Reflected Light>

5: No unevenness was observed.
4: Slight unevenness was observed.
3: A small quantity of unevenness was observed.
2: Unevenness was observed in the whole.
1: Intense unevenness was observed in the whole.

EXAMPLES

Hereinafter, our films will be described on the basis of working examples.

Example 1

PET pellets (limiting viscosity: 0.63 dL/g) containing no external particles were sufficiently vacuum-dried, and then supplied to an extruder and melted at 285° C. so as to be extruded from a T-shaped mouthpiece into a sheet form. An electrostatic casting method was used to wind the workpiece onto a mirror plane casting drum having a surface temperature of 25° C. and cool/solidify the workpiece. The thus-obtained non-drawn film was heated to a temperature of 88° C., and then drawn 3.3 times in the longitudinal direction to yield a monoaxially drawn film. In the air, this monoaxially drawn film was subjected to corona discharge treatment. A laminating-layer-forming liquid paint described below was applied onto one of the treated surfaces. While the monoaxially drawn film applied with the laminating-layer-forming liquid paint was grasped with a clip, the film was introduced into a pre-heating zone so as to be dried at a temperature of 95° C. Thereafter, the resultant was continuously drawn 3.4 times in the width direction in a heating zone of 110° C. of temperature. Furthermore, the film was subjected to heat treatment in a heating zone of 235° C. of temperature, thereby yielding a laminate PET film the crystal orientation of which was completed. The thickness of the yielded PET film was 100 μm, and the thickness of the laminating layer was 0.07 μm. The results are shown in Table 1. The film was a film excellent in transparency including haze and overall light ray transmittance, and further excellent in adhesion, adhesion after wet heat aging, and adhesion after irradiation with UV rays.

"Laminating-Layer-Forming Liquid Paint"

Liquid A1:

Acrylic urethane copolymer resin dispersed, anionic aqueous liquid ("SANNALON" WG-353 (trial product) manufactured by Sannan Gosei Kagaku Kabushiki Kaisha). The weight ratio of solids in the acrylic resin component/solids in the urethane resin component was 12/23. Two parts by weight of triethylamine were used to turn the components into an aqueous dispersion.

Liquid paint B1:

An aqueous dispersion of a polyester resin (glass transition temperature: 38° C.) having the following copolymerization composition:

<Copolymerizing Components>

| | |
|---|---|
| Isophthalic acid | 90% by mole |
| 5-Na sulfoisophtalic acid | 10% by mole |
| Ethylene glycol | 2% by mole |
| Diethylene glycol | 78% by mole |
| Cyclohexanedimethanol | 20% by mole |

Liquid Paint C1:

Block isocyanate aqueous dispersion ("ELASTRON" E-37, manufactured by Dai-ichi Kogyo Seiyaku Co., Ltd.)

The liquid paint A1 and the liquid paint B1 were mixed with each other at the following ratio by weight between solids therein: the liquid paint A1/the liquid paint B1=95/5. Into 100 parts by weight of this mixture were incorporated 5 parts by weight of the liquid paint C1, and the resultant mixture was used as a laminating-layer-forming liquid paint. At this time, the weight ratio between solids in the individual liquid paints was as follows: the liquid paint A1/the liquid paint B1/the liquid paint C1=95/5/5.

Example 2

A laminated PET film was yielded in the same way as in Example 1 except that a laminating-layer-forming liquid paint described below was used instead of the laminating-layer-forming liquid paint used in Example 1.

"Laminating-Layer-Forming Liquid Paint"

The same liquid paints A1, B1 and C1 as in Example 1 were used.

The liquid paint A1 and the liquid paint B1 were mixed with each other at the following weight ratio between solids therein: the liquid paint A1/the liquid paint B1=95/5. Into 100 parts by weight of this mixture were incorporated 30 parts by weight of the liquid paint C1, and the resultant mixture was used as a laminating-layer-forming liquid paint. At this time, the weight ratio between solids in the individual liquid paints was as follows: the liquid paint A1/the liquid paint B1/the liquid paint C1=95/5/30.

The results are shown in Table 1. The haze was slightly high, but the transparency was excellent. Furthermore, the adhesion was quite excellent. Further excellent were the adhesion after wet heat aging and the adhesion after irradiation with UV rays.

Example 3

A laminated PET film was yielded in the same way as in Example 1 except that a laminating-layer-forming liquid paint described below was used instead of the laminating-layer-forming liquid paint used in Example 1.

"Laminating-Layer-Forming Liquid Paint"

The same liquid paints A1, B1 and C1 as in Example 1 were used.

The liquid paint A1 and the liquid paint B1 were mixed with each other at the following weight ratio between solids therein: the liquid paint A1/the liquid paint B1=90/10. Into 100 parts by weight of this mixture were incorporated 70 parts by weight of the liquid paint C1, and the resultant mixture was used as a laminating-layer-forming liquid paint. At this time, the weight ratio between solids in the individual liquid paints was as follows: the liquid paint A1/the liquid paint B1/the liquid paint C1=90/10/70.

The results are shown in Table 1. The haze was slightly high, but the transparency was excellent. Additionally, the adhesion and the adhesion after wet heat aging were quite excellent, and the adhesion after irradiation with UV rays was excellent.

Example 4

A laminated PET film was yielded in the same way as in Example 1 except that a laminating-layer-forming liquid paint described below was used instead of the laminating-layer-forming liquid paint used in Example 1.

"Laminating-Layer-Forming Liquid Paint"

The same liquid paint A1 as in Example 1 was used.

Liquid Paint B2:

An ammonium-salt type aqueous dispersion of a polyester resin (glass transition temperature: 37° C.) having the following copolymerization composition:

<Copolymerizing Components>

| | |
|---|---|
| Terephthalic acid | 30% by mole |
| Isophthalic acid | 60% by mole |
| Trimellitic acid | 10% by mole |
| Ethylene glycol | 50% by mole |
| Neopentyl glycol | 50% by mole |

Liquid Paint C2:

An aqueous solution of a polyvalent carbodiimide ("CARBODILIGHT" V-04, manufactured by Nisshinbo Industries, Inc., carbodiimide equivalent: 334)

The liquid paint A1 and the liquid paint B2 were mixed with each other at the following weight ratio between solids therein: the liquid paint A1/the liquid paint B2=70/30. Into 100 parts by weight of this mixture were incorporated 5 parts by weight of the liquid paint C2, and the resultant mixture was used as a laminating-layer-forming liquid paint. At this time, the weight ratio between solids in the individual liquid paints was as follows: the liquid paint A1/the liquid paint B2/the liquid paint C2=70/30/5. The results are shown in Table 1. The transparency including the haze and the overall light ray transmittance was excellent. Furthermore, excellent were the adhesion, the adhesion after wet heating aging, and the adhesion after irradiation with UV rays.

Example 5

A laminated PET film was yielded in the same way as in Example 1 except that a laminating-layer-forming liquid paint described below was used instead of the laminating-layer-forming liquid paint used in Example 1.

"Laminating-Layer-Forming Liquid Paint"

The same liquid paints A1, B2 and C2 as in Example 3 were used.

The liquid paint A1 and the liquid paint B2 were mixed with each other at the following weight ratio between solids therein: the liquid paint A1/the liquid paint B2=70/30. Into 100 parts by weight of this mixture were incorporated 20 parts by weight of the liquid paint C2, and the resultant mixture was used as a laminating-layer-forming liquid paint. At this time, the weight ratio between solids in the individual liquid paints was as follows: the liquid paint A1/the liquid paint B2/the liquid paint C2=70/30/20. The results are shown in Table 1. The transparency including the haze and the overall light ray transmittance was quite excellent, and the adhesion was also quite excellent. Excellent were the adhesion after wet heat aging, and the adhesion after irradiation with UV rays.

Example 6

A laminated PET film was yielded in the same way as in Example 1 except that a laminating-layer-forming liquid paint described below was used instead of the laminating-layer-forming liquid paint used in Example 1.

"Laminating-Layer-Forming Liquid Paint"

Liquid Paint A2:

To an aqueous dispersion of an aqueous polyurethane ("HYDRAN" AP-40, manufactured by Dainippon Ink & Chemicals, Inc.) containing carboxyl groups was further added water so as to dilute the dispersion into 10% by weight. Into 90 parts by weight of the dilution was dissolved 0.1 part by weight of azoisobutyronitrile as a polymerization initiator. Thereto was further added an acrylic monomer described below (to adjust the weight ratio of solids in the acrylic resin component/solids in the urethane resin component finally to 50/50). The components were caused to react with each other for polymerization at a temperature of 80 to 82° C. for 2 hours, thereby yielding an aqueous dispersion of an acrylic urethane copolymer resin.

<Copolymerizing Components>

| Methyl methacrylate | 61% by weight |
| Ethyl acrylate | 35% by weight |
| Acrylic acid | 2% by weight |
| N-methylolacrylamide | 2% by weight |

The same liquid paint B2 as in Example 4 was used.
The same liquid paint C1 as in Example 1 was used.
The liquid paint A2 and the liquid paint B2 were mixed with each other at the following weight ratio between solids therein: the liquid paint A2/the liquid paint B2=60/40. Into 100 parts by weight of this mixture were incorporated 25 parts by weight of the liquid paint C1, and the resultant mixture was used as a laminating-layer-forming liquid paint. At this time, the weight ratio between solids in the individual liquid paints was as follows: the liquid paint A2/the liquid paint B2/the liquid paint C1=60/40/25. The results are shown in Table 1. The haze was slightly high, but the transparency was excellent. The adhesion was quite excellent. Further excellent were the adhesion after wet heat aging and the adhesion after irradiation with UV rays.

Example 7

A laminated PET film was yielded in the same way as in Example 1 except that a laminating-layer-forming liquid paint described below was used instead of the laminating-layer-forming liquid paint used in Example 1.

"Laminating-Layer-Forming Liquid Paint"

The same liquid paint A1 as in Example 1 was used.
The same liquid paint B2 as in Example 4 was used.
The same liquid paint C1 as in Example 1 was used.
The same liquid paint C2 as in Example 4 was used.
The liquid paint A1 and the liquid paint B2 were mixed with each other at the following weight ratio between solids therein: the liquid paint A1/the liquid paint B2=80/20. Into 100 parts by weight of this mixture were incorporated 10 parts by weight of the liquid paint C1 and 5 parts by weight of the liquid paint C2, and the resultant mixture was used as a laminating-layer-forming liquid paint. At this time, the weight ratio between solids in the individual liquid paints was as follows: the liquid paint A1/the liquid paint B2/the liquid paint C1/the liquid paint C2=80/20/10/5. The results are shown in Table 1. The haze and the overall light ray transmittance were excellent, and the adhesion and the adhesion after wet heat aging were quite excellent. The adhesion after irradiation with UV rays was also excellent.

Example 8

A laminated PET film was yielded in the same way as in Example 1 except that a laminating-layer-forming liquid paint described below was used instead of the laminating-layer-forming liquid paint used in Example 1.

"Laminating-Layer-Forming Liquid Paint"

The same liquid paint A1 as in Example 1 was used.
The same liquid paint B2 as in Example 4 was used.
The same liquid paint C1 as in Example 1 was used.
The same liquid paint C2 as in Example 4 was used.
The liquid paint A1 and the liquid paint B2 were mixed with each other at the following weight ratio between solids therein: the liquid paint A1/the liquid paint B2=80/20. Into 100 parts by weight of this mixture were incorporated 30 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint A1/the liquid paint B2/the liquid paint C1/the liquid paint C2=80/20/30/10. The results are shown in Table 1. The haze and the overall light ray transmittance were excellent. Furthermore, quite excellent were the adhesion, the adhesion after wet heat aging, and the adhesion after irradiation with UV rays.

Example 9

A laminated PET film was yielded in the same way as in Example 1 except that a laminating-layer-forming liquid paint described below was used instead of the laminating-layer-forming liquid paint used in Example 1.

"Laminating-Layer-Forming Liquid Paint"

The same liquid paint A1 as in Example 1 was used.
The same liquid paint B2 as in Example 4 was used.
The same liquid paint C1 as in Example 1 was used.
The same liquid paint C2 as in Example 4 was used.
The liquid paint A1 and the liquid paint B2 were mixed with each other at the following weight ratio between solids therein: the liquid paint A1/the liquid paint B2=70/30. Into 100 parts by weight of this mixture were incorporated 25 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint A1/the liquid paint B2/the liquid paint C1/the liquid paint C2=70/30/25/10. The results are shown in Table 1. The haze and the overall light ray transmittance were quite excellent. Furthermore, quite excellent were the adhesion, the adhesion after wet heat aging, and the adhesion after irradiation with UV rays.

Example 10

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
  The same liquid paint A1 as in Example 1 was used.
  Liquid Paint B3:
  An ammonium salt type aqueous dispersion of a polyester resin (glass transition temperature: 20° C.) having a copolymerization composition described below.
<Copolymerizing Components>

| | |
|---|---|
| Terephthalic acid | 60% by mole |
| Isophthalic acid | 14% by mole |
| Sebacic acid | 6% by mole |
| Trimellitic acid | 20% by mole |
| Ethylene glycol | 28% by mole |
| Neopentyl glycol | 38% by mole |
| 1,4-butanediol | 34% by mole |

The same liquid paint C1 as in Example 1 was used.
  The same liquid paint C2 as in Example 4 was used.
  The liquid paint A1 and the liquid paint B3 were mixed with each other at the following weight ratio between solids therein: the liquid paint A1/the liquid paint B3=70/30. Into 100 parts by weight of this mixture were incorporated 25 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint A1/the liquid paint B3/the liquid paint C1/the liquid paint C2=70/30/25/10. The results are shown in Table 1. The haze and the overall light ray transmittance were quite excellent. Furthermore, quite excellent were the adhesion, the adhesion after wet heat aging, and the adhesion after irradiation with UV rays.

Example 11

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
  The same liquid paint A1 as in Example 1 was used.
  The same liquid paint B2 as in Example 4 was used.
  The same liquid paint C1 as in Example 1 was used.
  The same liquid paint C2 as in Example 4 was used.
  The liquid paint A1 and the liquid paint B2 were mixed with each other at the following weight ratio between solids therein: the liquid paint A1/the liquid paint B2=30/70. Into 100 parts by weight of this mixture were incorporated 25 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint A1/the liquid paint B2/the liquid paint C1/the liquid paint C2=30/70/25/10. The results are shown in Table 1. The haze and the overall light ray transmittance were quite excellent. Furthermore, excellent were the adhesion, the adhesion after wet heat aging, and the adhesion after irradiation with UV rays.

Example 12

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
  The same liquid paint A1 as in Example 1 was used.
  The same liquid paint B2 as in Example 4 was used.
  Liquid paint C3:
  An aqueous dispersion of a block isocyanate ("PROMINATE" XC-915, manufactured by Takeda Chemical Industries, Ltd.)
  The same liquid paint C2 as in Example 4 was used.
  The liquid paint A1 and the liquid paint B2 were mixed with each other at the following weight ratio between solids therein: the liquid paint A1/the liquid paint B2=90/10. Into 100 parts by weight of this mixture were incorporated 30 parts by weight of the liquid paint C3 and 10 parts by weight of the liquid paint C2, and the resultant mixture was used as a laminating-layer-forming liquid paint. At this time, the weight ratio between solids in the individual liquid paints was as follows: the liquid paint A1/the liquid paint B2/the liquid paint C3/the liquid paint C2=90/10/30/10.
  The results are shown in Table 1. The haze was slightly high, but the transparency was excellent. The adhesion was quite excellent. Further excellent were the adhesion after wet heat aging and the adhesion after irradiation with UV rays.

Example 13

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
  The same liquid paint A1 as in Example 1 was used.
  The same liquid paint B2 as in Example 4 was used.
  The same liquid paint C1 as in Example 1 was used.
  Liquid Paint C4:
  An aqueous solution of a polyvalent carbodiimide ("CARBODILIGHT" V-02, manufactured by Nisshinbo Industries, Inc., carbodiimide equivalent: 590). The liquid paint A1 and the liquid paint B2 were mixed with each other at the following weight ratio between solids therein: the liquid paint A1/the liquid paint B2=90/10. Into 100 parts by weight of this mixture were incorporated 25 parts by weight of the liquid paint C1 and 10 parts by weight of the liquid paint C4, and the resultant mixture was used as a laminating-layer-forming liquid paint. At this time, the weight ratio between solids in the individual liquid paints was as follows: the liquid paint A1/the liquid paint B2/the liquid paint C1/the liquid paint C4=90/10/25/10. The results are shown in Table 1. The transparency including the haze and the overall light ray transmittance was excellent, and the adhesion and the adhesion after wet heat aging were quite excellent. The adhesion after irradiation with UV rays was also excellent.

Example 14

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"

The same liquid paints A1, B2, C1 and C2 as in Example 9 were used.

Liquid Paint Z1:

An aqueous paint of colloidal silica having an average particle diameter of 80 nm ("KATAROID" Si-80P, manufactured by Catalysis & Chemicals Industries Co., Ltd.).

The liquid paint A1 and the liquid paint B2 were mixed with each other at the following weight ratio between solids therein: the liquid paint A1/the liquid paint B2=70/30. Into 100 parts by weight of this mixture were incorporated 25 parts by weight of the liquid paint C1, 10 parts by weight of the liquid paint C2, and 3 parts by weight of the liquid paint Z1, and the resultant mixture was used as a laminating-layer-forming liquid paint. At this time, the weight ratio between solids in the individual liquid paints was as follows: the liquid paint A1/the liquid paint B2/the liquid paint C1/the liquid paint C2/the liquid paint Z1=70/30/25/10/3. The results are shown in Table 1. The haze and the overall light ray transmittance were quite excellent. Furthermore, quite excellent were the adhesion, the adhesion after wet heat aging, and the adhesion after irradiation with UV rays.

Example 15

A laminated PET film was yielded in the same way as in Example 9 except that PET pellets (limiting viscosity: 0.63 dL/g) containing 0.2% by weight of colloidal silica having an average particle diameter of 1.5 μm were used as the PET pellets used in Example 9, and a laminating-layer-forming liquid paint described below was used.
"Laminating-Layer-Forming Liquid Paint"

The same liquid paints A1, B2, C1 and C2 as in Example 9 were used.

The liquid paint A1 and the liquid paint B2 were mixed with each other at the following weight ratio between solids therein: the liquid paint A1/the liquid paint B2=70/30. Into 100 parts by weight of this mixture were incorporated 25 parts by weight of the liquid paint C1, and 10 parts by weight of the liquid paint C2, and the resultant mixture was used as a laminating-layer-forming liquid paint. At this time, the weight ratio between solids in the individual liquid paints was as follows: the liquid paint A1/the liquid paint B2/the liquid paint C1/the liquid paint C2/=70/30/25/10. Quite excellent were the adhesion, the adhesion after wet heat aging, and the adhesion after irradiation with UV rays. The overall light ray transmittance was high and the haze was high. Thus, the film can be preferably used as, for example, an optical diffusion film.

Example 16

PET pellets (limiting viscosity: 0.60 dL/g) containing 10% by weight of polymethylpentene were sufficiently vacuum-dried, and then supplied to an extruder A heated to 280° C. Additionally, PET pellets (limiting viscosity: 0.63 dL/g) containing 0.002% by weight of colloidal silica having an average particle diameter of 1.5 μm were sufficiently vacuum-dried, and then supplied to an extruder B heated to 285° C. The polymers extruded from the extruders A and B were co-extruded and laminated to give a three-layer structure of B/A/B. In this way, the laminate was extruded from a T-shaped mouthpiece into a sheet form. An electrostatic casting method was used to wind the workpiece onto a mirror plane casting drum having a surface temperature of 25° C. and cool/solidify the workpiece, thereby yielding a non-drawn film. The thus-yielded non-drawn film was heated to a temperature of 90° C., and then drawn 3.2 times in the longitudinal direction to yield a monoaxially drawn film. In the air, this monoaxially drawn film was subjected to corona discharge treatment. A laminating-layer-forming liquid paint described below was applied onto one of the treated surfaces. While the monoaxially drawn film applied with the laminating-layer-forming liquid paint was grasped with a clip, the film was introduced into a pre-heating zone so as to be dried at a temperature of 95° C. Subsequently, the resultant was continuously drawn 3.3 times in the width direction in a heating zone of 110° C. of temperature. Furthermore, the film was subjected to heat treatment in a heating zone of 210° C. of temperature, thereby yielding a laminated PET film the crystal orientation of which was completed. The thickness of the yielded PET film was 125 μm (thickness ratio: B/A/B=5/90/5), and the thickness of the laminating layer was 0.1 μm.
"Laminating-Layer-Forming Liquid Paint"

The same liquid paints A1, B2, C1 and C2 as in Example 9 were used.

The liquid paint A1 and the liquid paint B2 were mixed with each other at the following weight ratio between solids therein: the liquid paint A1/the liquid paint B2=70/30. Into 100 parts by weight of this mixture were incorporated 25 parts by weight of the liquid paint C1, and 10 parts by weight of the liquid paint C2, and the resultant mixture was used as a laminating-layer-forming liquid paint. At this time, the weight ratio between solids in the individual liquid paints was as follows: the liquid paint A1/the liquid paint B2/the liquid paint C1/the liquid paint C2/=70/30/25/10. The results are shown in Table 1. Quite excellent were the adhesion, the adhesion after wet heat aging, and the adhesion after irradiation with UV rays. The overall light ray transmittance was high and the haze was high. Thus, the film can be preferably used as, for example, an optical diffusion film.

Comparative Example 1

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"

The same liquid paint B2 as in Example 4 was used.
The same liquid paint C1 as in Example 1 was used.
The same liquid paint C2 as in Example 4 was used.

Into 100 parts by weight of the liquid paint B2 were incorporated 10 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint B2/the liquid paint C1/the liquid paint C2=100/10/10. The results are shown in Table 1. Poor were the adhesion, the adhesion after wet heat aging, and the adhesion after irradiation with UV rays.

Comparative Example 2

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"

The same liquid paint A1 as in Example 1 was used.
The same liquid paint C1 as in Example 1 was used.
The same liquid paint C2 as in Example 4 was used.

Into 100 parts by weight of the liquid paint A1 were incorporated 5 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint A1/the liquid paint C1/the liquid paint C2=100/5/10. The results are shown in Table 1. The adhesion after irradiation with UV rays was poor.

Comparative Example 3

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
Liquid Paint D1:
An aqueous emulsion wherein acrylic monomers described below were copolymerized with each other.
<Copolymerizing Components>

| | |
|---|---|
| Methyl methacrylate | 65% by weight |
| Ethyl acrylate | 32% by weight |
| Acrylic acid | 2% by weight |
| N-methylolacrylamide | 1% by weight |

Liquid Paint D2:
Urethane resin aqueous dispersion ("HYDRAN" AP-20, manufactured by Dainippon Ink & Chemicals, Inc.
The same liquid paint C1 as in Example 1 was used.
The same liquid paint C2 as in Example 4 was used.
The liquid paint D1 and the liquid paint D2 were mixed with each other at the following weight ratio between solids therein: the liquid paint D1/the liquid paint D2=40/60. Into 100 parts by weight of this mixture were incorporated 5 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint D1/the liquid paint D2/the liquid paint C1/the liquid paint C2=40/60/5/10. The results are shown in Table 1. Poor were the adhesion, the adhesion after wet heat aging, and the adhesion after irradiation with UV rays.

Comparative Example 4

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
The same liquid paint D1 as in Comparative Example 3 was used.
The same liquid paint B2 as in Example 4 was used.
The same liquid paint C1 as in Example 1 was used.
The same liquid paint C2 as in Example 4 was used.
The liquid paint D1 and the liquid paint B2 were mixed with each other at the following weight ratio between solids therein: the liquid paint D1/the liquid paint B2=70/30. Into 100 parts by weight of this mixture were incorporated 5 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint D1/the liquid paint B2/the liquid paint C1/the liquid paint C2=70/30/5/10. The results are shown in Table 1. Poor were the adhesion, the adhesion after wet heat aging, and the adhesion after irradiation with UV rays.

Comparative Example 5

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
The same liquid paint A1 as in Example 1 was used.
The same liquid paint B1 as in Example 1 was used.
Liquid Paint E1:
A liquid paint wherein a methylolated melamine crosslinking agent ("NIKALUCK" MW-12LF, manufactured by Sanwa Chemical Co., Ltd.) was diluted with a mixed solvent of isopropyl alcohol and water (10/90 (ratio by weight)).
The liquid paint A1 and the liquid paint B1 were mixed with each other at the following weight ratio between solids therein: the liquid paint A1/the liquid paint B1=60/40. Into 100 parts by weight of this mixture were incorporated 25 parts by weight of the liquid paint E1, and the resultant mixture was used as a laminating-layer-forming liquid paint. At this time, the weight ratio between solids in the individual liquid paints was as follows: the liquid paint A1/the liquid paint B1/the liquid paint E1=60/40/25. The results are shown in Table 1. Poor were the adhesion, the adhesion after wet heat aging, and the adhesion after irradiation with UV rays.

Comparative Example 6

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
The same liquid paint A1 as in Example 1 was used.
The same liquid paint B1 as in Example 1 was used.
Liquid Paint E2:
An aqueous paint wherein a polyglycerol polyglycidyl ether type epoxy crosslinking agent ("DENACOL" EX-512 (molecular weight: about 630, and epoxy equivalent: 168) manufactured by Nagase ChemteX Corp.) was dissolved in water.
The liquid paint A1 and the liquid paint B1 were mixed with each other at the following weight ratio between solids therein: the liquid paint A1/the liquid paint B1=60/40. Into 100 parts by weight of this mixture were incorporated 40 parts by weight of the liquid paint E2, and the resultant mixture was used as a laminating-layer-forming liquid paint. At this time, the weight ratio between solids in the individual liquid paints was as follows: the liquid paint A1/the liquid paint B1/the liquid paint E2=60/40/40. The results are shown in Table 1. Poor were the adhesion, the adhesion after wet heat aging, and the adhesion after irradiation with UV rays.

Comparative Example 7

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
The same liquid paint A1 as in Example 1 was used.
The same liquid paint B1 as in Example 1 was used.
The same liquid paint C1 as in Example 1 was used.

The liquid paint A1 and the liquid paint B1 were mixed with each other at the following weight ratio between solids therein: the liquid paint A1/the liquid paint B1=70/30. Into 100 parts by weight of this mixture were incorporated 80 parts by weight of the liquid paint C1, and the resultant mixture was used as a laminating-layer-forming liquid paint. At this time, the weight ratio between solids in the individual liquid paints was as follows: the liquid paint A1/the liquid paint B1/the liquid paint C1=70/30/80. The results are shown in Table 1. Poor were the adhesion after wet heat aging, and the adhesion after irradiation with UV rays.

Comparative Example 8

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
  The same liquid paint A1 as in Example 1 was used.
  The same liquid paint B1 as in Example 1 was used.
  The same liquid paint C1 as in Example 1 was used.
  The liquid paint A1 and the liquid paint B1 were mixed with each other at the following weight ratio between solids therein: the liquid paint A1/the liquid paint B1=70/30. Into 100 parts by weight of this mixture were incorporated 3 parts by weight of the liquid paint C1, and the resultant mixture was used as a laminating-layer-forming liquid paint. At this time, the weight ratio between solids in the individual liquid paints was as follows: the liquid paint A1/the liquid paint B1/the liquid paint C1=70/30/3. The results are shown in Table 1. Poor were the adhesion after wet heating resisting, and the adhesion after irradiation with UV rays.

Example 17

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
  Liquid Paint A3:
  Polycaprolactone was used as a polyol component and hexamethylene diisocyanate was used as a diisocyanate component to prepare a polyurethane aqueous dispersion having a polycaprolactone skeleton. Thereto was further added water to dilute the dispersion into 10% by weight. Into 90 parts by weight of the dispersion was dissolved 0.1 part by weight of azoisobutyronitrile as a polymerization initiator. Thereto was further added an acrylic monomer described below (to adjust the weight ratio of solids in the acrylic resin component/solids in the urethane resin component finally to 50/50). The components were caused to react with each other for polymerization at a temperature of 80 to 82° C. for 2 hours, thereby yielding an aqueous dispersion of an acrylic urethane copolymer resin.
<Copolymerizing Components>

| Methyl methacrylate | 62% by weight |
| Ethyl acrylate | 35% by weight |
| Acrylic acid | 2% by weight |
| N-methylolacrylamide | 1% by weight |

The same liquid paint B2 as in Example 4 was used.
  The same liquid paint C1 as in Example 1 was used.
  The same liquid paint C2 as in Example 4 was used.
  The liquid paint A3 and the liquid paint B2 were mixed with each other at the following weight ratio between solids therein: the liquid paint A3/the liquid paint B2=70/30. Into 100 parts by weight of this mixture were incorporated 25 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint A3/the liquid paint B2/the liquid/the liquid paint C1/the liquid paint C2=70/30/25/10. The results are shown in Table 2. The haze and the overall light ray transmittance were quite excellent. Furthermore, quite excellent were the adhesion, the adhesion after wet heat aging, and the adhesion after irradiation with UV rays.

Example 18

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
  Liquid Paint A4:
  An aqueous dispersion of an acrylic urethane copolymer resin was yielded in the same way in Example 17 except that in the acrylic urethane copolymer resin used therein, the acrylic monomer was changed to the following:
<Copolymerizing Components>

| Methyl methacrylate | 60% by weight |
| Ethyl acrylate | 35% by weight |
| Acrylic acid | 2% by weight |
| N-methylolacrylamide | 1% by weight |

The same liquid paint B2 as in Example 4 was used.
  The same liquid paint C1 as in Example 1 was used.
  The same liquid paint C2 as in Example 4 was used.
  The liquid paint A4 and the liquid paint B2 were mixed with each other at the following weight ratio between solids therein: the liquid paint A4/the liquid paint B2=70/30. Into 100 parts by weight of this mixture were incorporated 25 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint A4/the liquid paint B2/the liquid/the liquid paint C1/the liquid paint C2=70/30/25/10. The results are shown in Table 2. The haze and the overall light ray transmittance were quite excellent. Furthermore, quite excellent were the adhesion, the adhesion after wet heat aging, and the adhesion after irradiation with UV rays.

Example 19

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
  The same liquid paint A4 as in Example 18 was used.
  The same liquid paint B2 as in Example 4 was used.
  The same liquid paint C1 as in Example 1 was used.
  The same liquid paint C2 as in Example 4 was used.
  The liquid paint A4 and the liquid paint B2 were mixed with each other at the following weight ratio between solids therein: the liquid paint A4/the liquid paint B2=75/25. Into 100 parts by weight of this mixture were incorporated 25 parts by weight of the liquid paint C1 and 10 parts by weight of the liquid paint C2, and the resultant mixture was used as a laminating-layer-forming liquid paint. At this time, the weight ratio between solids in the individual liquid paints was as follows: the liquid paint A4/the liquid paint B2/the liquid/ the liquid paint C1/the liquid paint C2=75/25/25/10. The results are shown in Table 2. The haze and the overall light ray transmittance were excellent. Furthermore, quite excellent were the adhesion, the adhesion after wet heat aging, and the adhesion after irradiation with UV rays.

Comparative Example 9

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
Liquid Paint A5:
An aqueous dispersion of an aqueous polyurethane having a polycarbonate skeleton ("TAKELUCK" W-6010, manufactured by Takeda Chemical Industries, Ltd.).
The liquid paint A5 was used as a laminating-layer-forming liquid paint. The results are shown in Table 2. The adhesion after wet heat aging and the adhesion after irradiation with UV rays were poor.

Comparative Example 10

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
The same liquid paint A5 as in Comparative Example 9 was used.
The same liquid paint C1 as in Example 1 was used.
Into 100 parts by weight of the liquid paint A5 were incorporated 25 parts by weight of the liquid paint C1, and the resultant mixture was used as a laminating-layer-forming liquid paint. At this time, the weight ratio between solids in the individual liquid paints was as follows: the liquid paint A5/the liquid paint C1=100/25. The results are shown in Table 2. The adhesion after wet heat aging and the adhesion after irradiation with UV rays were poor.

Comparative Example 11

A laminated PET film was yielded in the same way as in Example 1 except that a laminating-layer-forming liquid paint described below was used instead of the laminating-layer-forming liquid paint used in Example 1.
"Laminating-Layer-Forming Liquid Paint"
The same liquid paint D2 as in Comparative Example 3 was used.
The same liquid paint C1 as in Example 1 was used.
Into 100 parts by weight of the liquid paint D2 were incorporated 10 parts by weight of the liquid paint C1, and the resultant mixture was used as a laminating-layer-forming liquid paint. At this time, the weight ratio between solids in the individual liquid paints was as follows: the liquid paint D2/the liquid paint C1=100/10. The results are shown in Table 2. The adhesion after wet heat aging and the adhesion after irradiation with UV rays were poor.

TABLE 1

| | Laminating layer composition | | Haze (%) | Overall light ray transmittance (%) | Adhesion | |
|---|---|---|---|---|---|---|
| | Kind | Weight ratio between solids | | | Ink A | Ink B |
| Example 1 | A1/B1/C1 | 95/5/5 | 1.5 | 92 | Very good | Very good |
| Example 2 | A1/B1/C1 | 95/5/30 | 2.5 | 92 | Very good | Very good |
| Example 3 | A1/B1/C1 | 90/10/70 | 3.8 | 91 | Very good | Very good |
| Example 4 | A1/B2/C2 | 70/30/5 | 1.2 | 92 | Very good | Good |
| Example 5 | A1/B2/C2 | 70/30/20 | 0.7 | 92 | Very good | Very good |
| Example 6 | A2/B2/C1 | 60/40/25 | 2.3 | 90 | Very good | Very good |
| Example 7 | A1/B2/C1/C2 | 80/20/10/5 | 1.5 | 92 | Very good | Very good |
| Example 8 | A1/B2/C1/C2 | 80/20/30/10 | 1.2 | 92 | Very good | Very good |
| Example 9 | A1/B2/C1/C2 | 70/30/25/10 | 0.8 | 93 | Very good | Very good |
| Example 10 | A1/B3/C1/C2 | 70/30/25/10 | 1.0 | 93 | Very good | Very good |
| Example 11 | A1/B2/C1/C2 | 30/70/25/10 | 0.5 | 93 | Very good | Very good |
| Example 12 | A1/B2/C3/C2 | 90/10/30/10 | 2.2 | 88 | Very good | Very good |
| Example 13 | A1/B2/C1/C4 | 90/10/25/10 | 1.9 | 89 | Very good | Very good |
| Example 14 | A1/B2/C1/C2/Z1 | 70/30/25/10/3 | 0.8 | 93 | Very good | Very good |
| Example 15 | A1/B2/C1/C2 | 70/30/25/10 | 12 | 89 | Very good | Very good |
| Example 16 | A1/B2/C1/C2 | 70/30/25/10 | 98 | 88 | Very good | Very good |
| Comparative Example 1 | B2/C1/C2 | 100/10/10 | 1.2 | 90 | Allowable | Very good |
| Comparative Example 2 | A1/C1/C2 | 100/5/10 | 0.8 | 92 | Good | Allowable |
| Comparative Example 3 | D1/D2/C1/C2 | 40/60/5/10 | 0.9 | 92 | Very good | Allowable |
| Comparative Example 4 | D1/B2/C1/C2 | 70/30/5/10 | 0.6 | 93 | Very good | Allowable |
| Comparative Example 5 | A1/B1/E1 | 60/40/25 | 0.9 | 92 | Very good | Good |
| Comparative Example 6 | A1/B1/E2 | 60/40/40 | 0.9 | 92 | Allowable | Allowable |

TABLE 1-continued

| | | | | | | |
|---|---|---|---|---|---|---|
| Comparative Example 7 | A1/B1/C1 | 70/30/80 | 4.3 | 89 | Very good | Good |
| Comparative Example 8 | A1/B1/C1 | 70/30/3 | 0.5 | 92 | Very good | Very good |

| | Adhesion | | Adhesion wet heat aging | Adhesion after irradiation with UV rays | Adhesion wet heat aging after irradiation with UV rays | Coating appearance Unevenness |
|---|---|---|---|---|---|---|
| | Ink C | Ink D | | | | |
| Example 1 | Good | Good | Good | Good | Good | 3 |
| Example 2 | Very good | Very good | Good | Very good | Good | 3 |
| Example 3 | Very good | Very good | Very good | Very good | Good | 3 |
| Example 4 | Good | Good | Good | Good | Good | 3 |
| Example 5 | Very good | Very good | Good | Good | Good | 3 |
| Example 6 | Very good | Very good | Good | Good | Good | 3 |
| Example 7 | Very good | Very good | Good | Very good | Good | 4 |
| Example 8 | Very good | Very good | Very good | Very good | Very good | 4 |
| Example 9 | Very good | Very good | Very good | Very good | Very good | 4 |
| Example 10 | Very good | Very good | Very good | Very good | Very good | 4 |
| Example 11 | Very good | Good | Good | Good | Good | 4 |
| Example 12 | Very good | Very good | Good | Good | Good | 4 |
| Example 13 | Very good | Very good | Very good | Very good | Good | 4 |
| Example 14 | Very good | Very good | Very good | Very good | Very good | 4 |
| Example 15 | Very good | Very good | Very good | Very good | Very good | 4 |
| Example 16 | Very good | Very good | Very good | Very good | Very good | 4 |
| Comparative Example 1 | Allowable | Allowable | Unallowable | Unallowable | Unallowable | 4 |
| Comparative Example 2 | Very good | Very good | Good | Allowable | Unallowable | 4 |
| Comparative Example 3 | Good | Allowable | Unallowable | Allowable | Unallowable | 4 |
| Comparative Example 4 | Allowable | Allowable | Unallowable | Allowable | Unallowable | 5 |
| Comparative Example 5 | Allowable | Allowable | Unallowable | Unallowable | Unallowable | 1 |
| Comparative Example 6 | Allowable | Unallowable | Unallowable | Unallowable | Unallowable | 3 |
| Comparative Example 7 | Very good | Good | Unallowable | Allowable | Unallowable | 3 |
| Comparative Example 8 | Very good | Very good | Allowable | Very good | Unallowable | 3 |

TABLE 2

| | Laminating layer composition | | Haze (%) | Overall light ray transmittance (%) | Adhesion | |
|---|---|---|---|---|---|---|
| | Kind | Weight ratio between solids | | | Ink A | Ink B |
| Example 17 | A3/B2/C1/C2 | 70/30/25/10 | 0.7 | 93 | Very good | Very good |
| Example 18 | A4/B2/C1/C2 | 70/30/25/10 | 0.7 | 93 | Very good | Very good |
| Example 19 | A4/B2/C1/C2 | 75/25/25/10 | 0.7 | 93 | Very good | Very good |
| Comparative Example 9 | A5 | 100 | 1.1 | 92 | Good | Good |
| Comparative Example 10 | A5/C1 | 100/25 | 2.0 | 91 | Good | Allowable |
| Comparative Example 11 | D2/C1 | 100/10 | 1.8 | 92 | Allowable | Unallowable |

TABLE 2-continued

| | Adhesion Ink C | Ink D | Adhesion wet heat aging | Adhesion after irradiation with UV rays | Adhesion wet heat aging after irradiation with UV rays | Coating appearance Unevenness |
|---|---|---|---|---|---|---|
| Example 17 | Very good | Very good | Very good | Very good | Very good | 5 |
| Example 18 | Very good | Very good | Very good | Very good | Very good | 5 |
| Example 19 | Very good | Very good | Very good | Very good | Very good | 5 |
| Comparative Example 9 | Good | Good | Unallowable | Allowable | Unallowable | 3 |
| Comparative Example 10 | Very good | Very good | Allowable | Allowable | Unallowable | 3 |
| Comparative Example 11 | Good | Good | Unallowable | Unallowable | Unallowable | 3 |

The invention claimed is:

1. A laminated film comprising:
   a thermoplastic resin film, and
   a laminated layer substantially free of unevenness disposed on at least one surface of the thermoplastic resin film;
   wherein the laminated layer comprises an acryl-urethane copolymer resin (A), a polyester resin (B), and a crosslinking agent (C) comprising an isocyanate crosslinking agent and a carbodiimide crosslinking agent, and the amount of the crosslinking agent (C) is from 5 to 70 parts by weight based on 100 parts by weight of the sum of the acryl-urethane resin (A) and the polyester resin (B).

2. The laminated film according to claim 1, wherein the acryl-urethane resin (A) contains polycaprolactone-based urethane.

3. The laminated film according to claim 1, wherein 0.5 to 5% by weight of N-methylolacrylamide as a crosslinking functional group is copolymerized with an acrylic resin component of the acryl-urethane copolymer resin (A).

4. The laminated film according to claim 1, wherein the crosslinking agent (C) comprises 10 to 40 parts by weight of the isocyanate crosslinking agent and 5 to 30 parts by weight of the carbodiimide crosslinking agent for 100 parts by weight of the sum of the acryl-urethane copolymer resin (A) and the polyester resin (B).

5. The laminated film according to claim 1, wherein the crosslinking agent (C) is a polymeric crosslinking agent.

6. The laminated film according to claim 1, wherein the polyester resin (B) has a side chain and a carboxyl group on the side chain.

7. The laminated film according to claim 1, wherein the acryl-urethane copolymer resin (A) originates from a core-shell polymer in which an acrylic component thereof constitutes a skin layer and a urethane component constitutes a core layer.

8. The laminated film according to claim 1, wherein a solid content ratio in weight in the acryl-urethane copolymer resin (A) and the polyester resin (B) is from 95/5 to 60/40 in the laminated layer.

9. The laminated film according to claim 1, wherein the thermoplastic resin film comprises a polyethylene terephthalate film or a polyethylene-2,6-naphthalate film.

* * * * *

UNITED STATES PATENT AND TRADEMARK OFFICE
CERTIFICATE OF CORRECTION

| | | |
|---|---|---|
| PATENT NO. | : 7,972,700 B2 | Page 1 of 1 |
| APPLICATION NO. | : 11/991836 | |
| DATED | : July 5, 2011 | |
| INVENTOR(S) | : Takada et al. | |

It is certified that error appears in the above-identified patent and that said Letters Patent is hereby corrected as shown below:

<u>In Column 4</u>
At lines 42 and 43, please delete "to carry out this disclosure".

Signed and Sealed this
Tenth Day of January, 2012

David J. Kappos
*Director of the United States Patent and Trademark Office*